United States Patent [19]

Prucher

[11] Patent Number: 5,384,171
[45] Date of Patent: Jan. 24, 1995

[54] STRUCTURALLY NETWORKED MATRIX CERAMIC COMPOSITE MATERIAL

[76] Inventor: Bryan P. Prucher, 52 N. Main, Clarkston, Mich. 48347

[21] Appl. No.: 802,601

[22] Filed: Dec. 5, 1991

[51] Int. Cl.[6] ............................................. B28B 21/00
[52] U.S. Cl. .................................. 428/34.4; 428/72; 428/73; 428/304.4; 428/306.6; 428/312.6; 428/317.9; 428/320.2; 501/80
[58] Field of Search .............. 428/34.4, 304.4, 72, 428/73, 312.6, 317.9, 320.2, 306.6, 312.2; 501/80

[56] References Cited

U.S. PATENT DOCUMENTS 4,816,332  3/1989  Fujita ........................ 428/306.6
4,822,694  4/1989  Randin ....................... 428/304.4

Primary Examiner—Alexander S. Thomas
Assistant Examiner—Nasser Ahmad
Attorney, Agent, or Firm—Weintraub, DuRoss & Brady

[57] ABSTRACT

A structurally networked matrix ceramic composite material is disclosed as comprising either a continuous ceramic skeletal structure or a series of noncontinuous ceramic skeletal structure surrounded by a resilient polymeric, metallic etc. material to obtain a structural composite with a high compression and tensile strength of ceramics while permitting an accurate prediction of the strength of the resulting composite. Alternatively, the skeletal matrix structure could have no surrounding material or substrate. The matrix structure distributes to all connecting members the compressive and tensile forces resulting from loads on the overall composite.

13 Claims, 2 Drawing Sheets

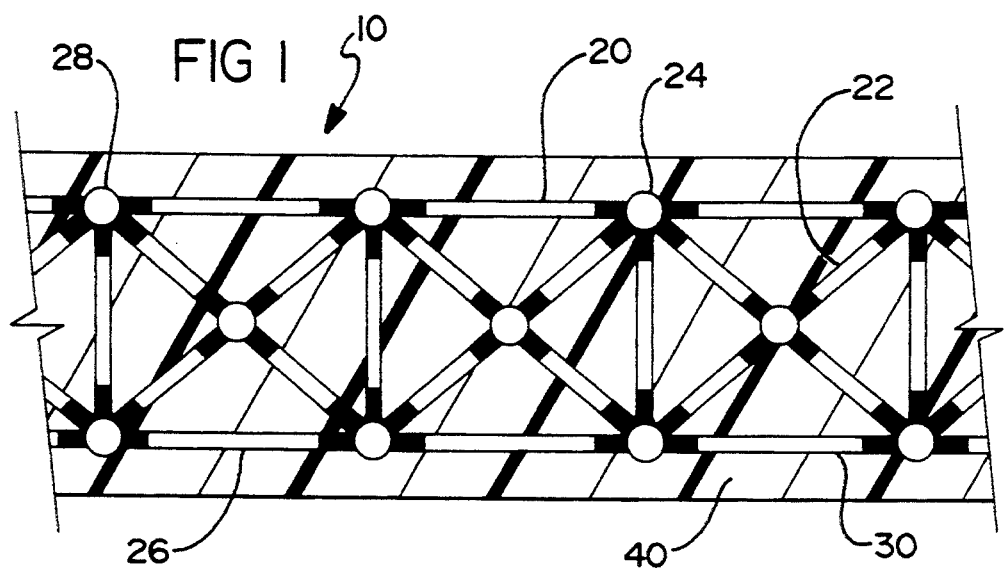
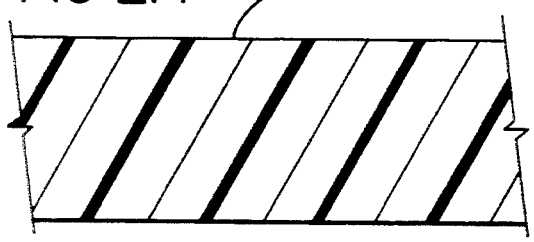
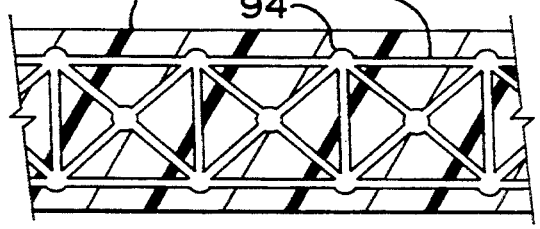
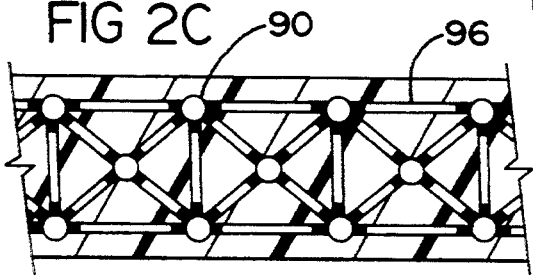
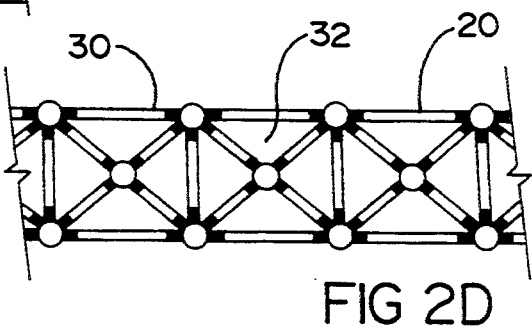

STRUCTURALLY NETWORKED MATRIX CERAMIC COMPOSITE MATERIAL

BACKGROUND OF INVENTION

1. Field of the Invention

The instant invention relates, generally, to ceramic structures. More specifically, the present invention relates to composite materials which are structurally reinforced by a ceramic matrix material.

2. Description of the Prior Art

There are known in the ceramic arts open-cell or open-pore ceramic foams which are primarily used as filter media. Because of the high compressive strength of ceramic materials and their three dimensional repeating dodecahedral structure, these foams have been proposed as ceramic skeletons for composite structural material such as in Applicant's prior application Ser. No. 07/542,778, filed Jun. 25, 1990, the disclosure of which is hereby incorporated by reference.

The composite structural members of the prior application use a ceramic foam dodecahedral skeleton with either hollow or solid legs as a reinforcing matrix. The ceramic foam is used because of its low weight, high compressive strength and low cost. However, the brittleness of the foam is a drawback.

Therefore, to form the structural members, a polymeric filler is normally used to saturate the ceramic skeleton and to overcome the brittleness handicap. Other materials may be used other than polymers to saturate the ceramic skeleton as long as they can withstand the destruction process that is performed on the ceramic skeleton without the filler.

Although the ceramic open-cell foam dodecahedral skeleton or matrix provides a strong reinforcement for composites, its strength is not consistent throughout the structure. This is due to the random nature of the dodecahedral structure. While the matrix structure exhibits a high degree of variation in cell size, position, and filament length and cross-sectional area, the resultant structural strength of each cell is variable and unpredictable.

The load bearing capabilities of a composite using a ceramic foam as a matrix are further compromised by discontinuities in the cells and interruptions in the off-limits that make up the cells. Because the strength of the reinforcement structure is variable, it can only be determined within a range through the use of statistical methods of approximation. This limits the design capabilities of the structure.

Thus, it is desirable to provide a ceramic reinforced composite that capitalizes on the inherently high compressive and tensile strength of the ceramic materials and permits an accurate prediction of the strength of the ceramic reinforced composite. This provides for more flexibility in designs of application. It is to this to which the present invention is directed.

SUMMARY OF THE INVENTION

The present invention provides a reinforcing structure utilizing the inherent advantages of ceramic materials while minimizing the drawbacks thereof. Accordingly, the present invention provides a structurally networked matrix ceramic composite material comprising:

(a) a three dimensional skeletal ceramic structure formed from a first material and having a continuous network of structural members connected to common attachment points;

(b) a substrate of a second material different from the first material and operatively attached to the ceramic structure.

The three dimensional skeletal structure is either a continuous linear or curvilinear structure which forms a matrix from a plurality of legs. The leg members of the matrix attach at common points or so called nodes. The nodes assist in distributing the forces imposed by a load throughout the structure.

The substrate of the composite, which absorbs energy, can be any type of material, ceramic or non-ceramic, as well as other ceramic composites, other than the specific ceramic composite (combination of chemistry and structure) used for the matrix structure. Either metallic-, polymeric-, ceramic- and like based materials may be used for the substrate in order to absorb energy. The type of material used for the substrate is determined by the design parameters of the structure.

A preferred method of making the matrix structure is to use a decomposable material to creates duplicate model of the continuous matrix structure. Holes of predetermined size and shape are introduced or formed or provided in the decomposable material. The holes are then filled with a slurry of ceramic material to distribute the ceramic throughout the model such that it then conforms to the shape thereof. The impregnated model is, then, placed in a furnace and fired until the decomposable material dissipates, leaving the hardened ceramic matrix.

This matrix structure eliminates the problem created by the variation and randomness of an open-cell dodecahedral foam. A predictably ordered ceramic structure is provided as a matrix for the composite material. The ordered structure of the ceramic matrix transfers and distributes mechanical loads evenly, efficiently and predictably. The net result is a ceramic composite material with far superior properties.

Other attendant advantages will be more readily appreciated as the same become better understood by reference to the following detailed description when considered in connection with the accompanying drawings in which like reference numerals designate like parts throughout the figures, in which:

BRIEF DESCRIPTION OF THE DRAWINGS

FIG. 1 is a perspective view of a continuous matrix in accordance with the present invention:

FIG. 2A–2D are cross-sectional views of the various stages for making a continuous matrix cluster in accordance herewith:

DESCRIPTION OF THE PREFERRED EMBODIMENT

Figure 4:
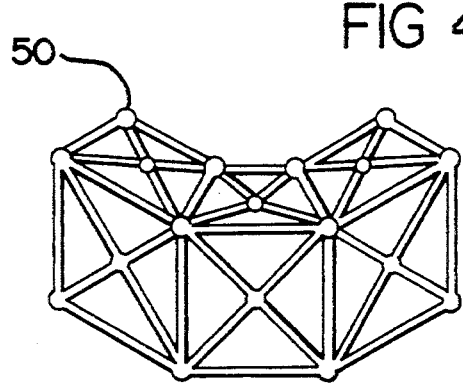
FIG. 4 is a perspective view of a curved composite in accordance with a third embodiment of the present invention.

Referring to FIG. 1, a preferred embodiment of the instant invention is depicted therein. The material is a structurally networked matrix ceramic composite 10 comprising: (a) a three dimensional skeletal ceramic structure 20 formed from a first material and having a continuous network of structural members 22 connected to common attachments points 24; and (b) a substrate 40 of a second material different from the first material and operatively attached to and surrounding the ceramic structure 20.

The three dimensional skeletal ceramic structure 20 has a continuous matrix network 30 of straight members or legs 20 which are connected to common points or nodes 28. The nodes 28 both collect from and distribute to adjacent connecting members 20 the compressive and tensile forces created in the matrix network 30 which result from loads imposed on the overall composite material 10.

To complete the structural matrix ceramic composite material 10, substrate 40 of a second material surrounds the matrix network 30. The substrate material 40 forms a barrier between the outside forces and the matrix network 30. The substrate 40 can be formed from any type of material, ceramic or non-ceramic, i.e., polymers, metal and the like, as well as a ceramic material other than that used to form the matrix 30. It is preferable that the substrate material 40 impart a characteristic of toughness to the resulting composite 10. To accomplish this, the substrate material 40 is selected to absorb energy through a slip plane or similar mechanism.

For example, the orientation of polymer molecules define the directions which yield to stress and those which do not yield to stress. When the polymer yield to stress, the molecules are, in effect, sliding past each other within the plane of molecular confinement. The ability of the substrate 40 to absorb energy or yield to outside stress protects the ceramic matrix 30 from shattering. The ceramic substrate material may be aluminum, silicon carbides, silicon nitrides, magnesium oxides, zuconium, boron carbide or the like. The polymer material may be polyurethane, thermoset plastics, polyethylene, thermoflow epoxies or the like. The metal materials may be aluminum, steel, silver, iron, copper, or the like. The substrate material 40 may be applied to the matrix network 30 by vacuum molding, vacuum casting, injection molding, sintering or immersion.

However, other alternatives for the substrate 40 may be employed, such as a gel or a fluid or although not preferred, the substrate 40 may be eliminated.

Figure 3:
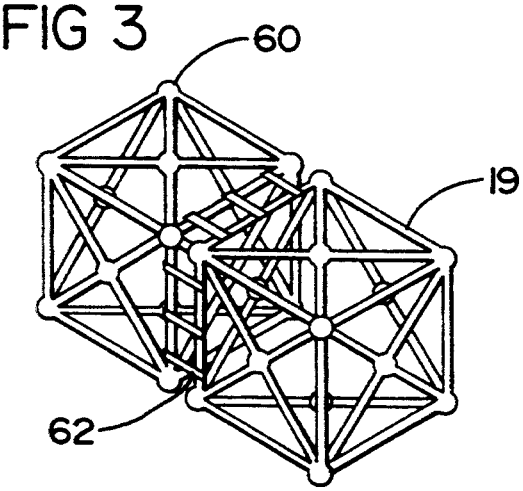
FIG. 3 is a perspective view of a noncontinuous composite in accordance with a second embodiment of the present invention.

The continuous matrix network structure 20 can be straight, as shown in FIG. 1, or any shape 50 as shown in FIG. 4. Also, the network may be a series of non-continuous matrices 60 stacked together in the desired shape, as shown in FIG. 3. The matrices 60 may be tied together by linking with the substrate 40 upon cooling or attaching with a ceramic clip 62, or the matrices 60 may be permitted to float free within the substrate 40.

As shown in FIGS. 2A-2D, there are generally four stakes employed for making the continuous matrix network structure 20. As seen in FIG. 2A, a thermally decomposable material 92, such as wax, polystyrene foam, or the like, is used to create a reverse negative duplicate or model 94 of the final composite matrix 20. Holes 98 are created within the model 94, using either a hotwire, laser, or the like. The hot wire pierces the mold material, forming legs 26 and nodes 28 of the desired three dimensional matrix configuration 30, as shown in FIG. 2B.

A ceramic slurry 96 is deposited into the holes 98 in the model 94, as seen in FIG. 2C. This can be accomplished by immersion, injection or any other common method familiar to the art.

The slurry 96 deposited into the holes 98 fills the holes 98, excluding any air or other nonessential from within the holes 98. The slurry 96 forms a solid within the holes when it cools.

Although the preferred matrix structure 20 defines solid legs 26 and nodes 28, the legs 26 and nodes 28 may be hollow. This further reduces the weight of the matrix structure 20 for composites that do not require the strength of solid legs.

The ceramic impregnated model 90 is placed in a furnace and fired until the decomposable material 92 that makes up the body of the model 96 dissipates. After the model 90 has been in the furnace for an extended period of time, a three-dimensional ceramic skeletal structure 20 of the desired matrix configuration 30 remains, as seen in FIG. 2D.

There are at least two methods for making the alternative non-continuous embodiment of the instant invention. The noncontinuous structure 60 being at least two matrix units where the legs are connected within the unit, but not connected to the next matrix unit. One method is the same as the method detailed above for the continuous matrix network 30, but the model created is for a noncontinuous matrix cluster 80. A second method for making the noncontinuous matrix 60 is a stereolithographic process.

According to a stereolithographic process, essentially, a powdered ceramic starter material is combined with a liquid photopolymeric material to make a slurry. The slurry is used as the fluid medium for creating a rigid structural network ceramic non-continuous matrix 60. The slurry is deposited into commercially available stereolithographic model making equipment where laser irradiation is used to create a rigid form of the matrix 60. The laser, controlled by a pre-programmed computer model of the matrix, polymerizes the photopolymeric shaping the slurry to make the rigid form of the matrix 60 to conform to the model. This is commercially known as selective polymerization.

The rigid form is placed in a furnace and fired to burn off the polymerized photopolymeric. This leaves a rigid three dimensional non-continuous ceramic matrix form 19, as seen in FIG. 3.

Figure 5:
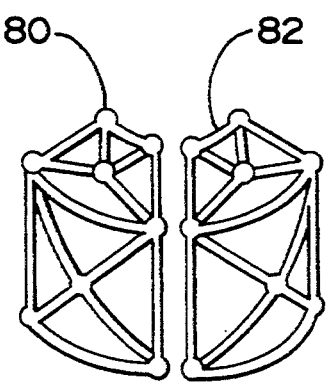
FIG. 5 is a perspective view of a curved leg matrix in accordance with a fourth embodiment of the present invention.

As shown in FIG. 5, the flexibility of the stereolithographic process permits the legs 82 of the non-continuous curved matrix 80 to be curved rather than straight. This further permits the final composite 10 to take on any desired form.

Figure 6:
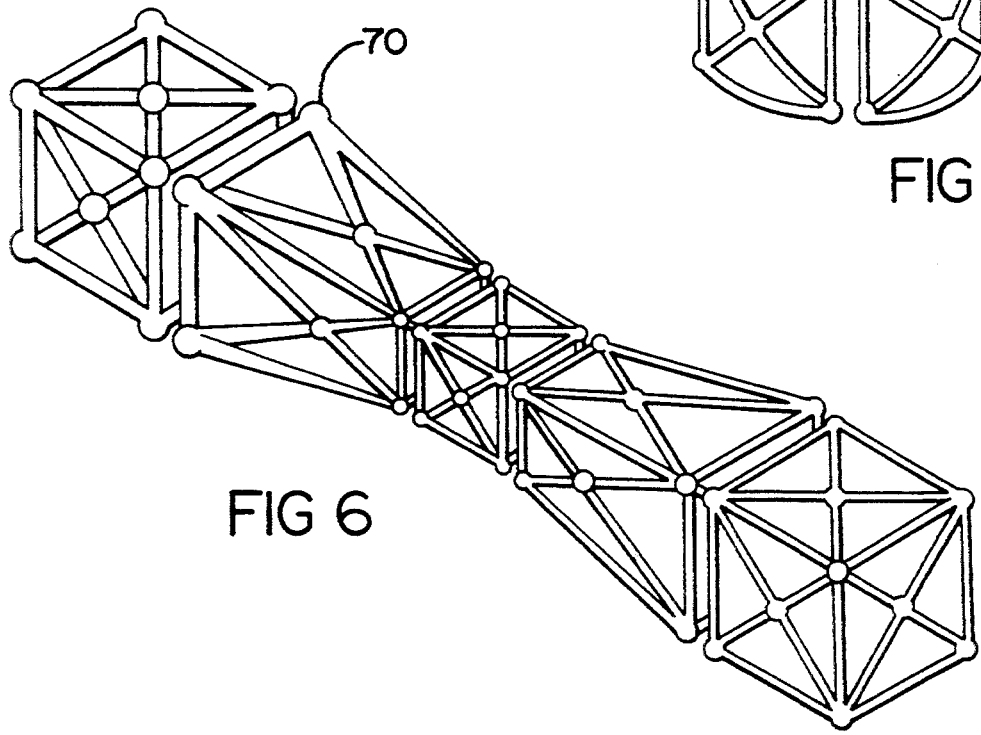
FIG. 6 is a perspective view of a varied load composite in accordance with a fifth embodiment of the present invention.

The combination of several different sizes and shapes of non-continuous matrices 60 provides for a varied load matrix 70 as shown in FIG. 6. The ability to combine different size and shape non-continuous matrices 60 provides further flexibility to mold reinforced composite items of any desired shape. It permits the artisan to design for increased strengthening where required and reduced strengthening when less is needed.

The final composite material 10, as shown in FIG. 1, is produced by filling the matrix voids 32 with a particular substrate material 40 necessary to impart the desired physical properties for the finished composite 10. This can be accomplished by an number of processes commonly known to the art, such as immersion, injection molding, impregnation, etc. To facilitate complete encasement of the ceramic matrix 30 by the substrate material 40, it is desirable to heat the ceramic matrix to that of the liquid or molten substrate material 40 prior to impregnation of the matrix 30.

Having, thus, described the invention, what is claimed is:

1. A structurally networked matrix ceramic composite material comprising:
    (a) a repeatable three-dimensional skeletal non-foam ceramic molded structure formed from a first material, the structure defining a non-random network of structural members connected to common load distributing attachment points;
    (b) a sub-strata of an energy absorbing second material different from the first material, the second material operatively attached to and surrounding the ceramic structure; and
    wherein the structural members and common attachment points cooperate to define a three-dimensional load bearing structure a desired shape.

2. The composite material of claim 1 wherein the skeletal ceramic structure comprises:
    (a) a plurality of straight members connecting at common attachment points; and
    (b) a plurality of nodes located at the common attachment points and integral with the straight members.

3. The composite material of claim 1 wherein the skeletal ceramic structure is a straight continuous network of straight members and nodes.

4. The composite material of claim 1 wherein the skeletal ceramic structure is a curved continuous network of straight members and nodes.

5. The composite material of claim 1 wherein at least a portion of the second material is disposed between the structure members of the ceramic structure.

6. The structural material of claim 1 wherein the substrate of second material covers the exterior surfaces of the three dimensional ceramic structure, the substrate material cover forming a barrier protecting the ceramic structure.

7. The structural material of claim 3 wherein the substrate of second material forms a barrier covering the exterior surfaces of the three dimensional ceramic structure.

8. The structural material of claim 4 wherein the substrate of second material forms a barrier covering the exterior surfaces of the three dimensional ceramic structure.

9. The structural material of claim 1 wherein the ceramic structure is a series of non-continuous matrices.

10. The structural material of claim 2 wherein the ceramic structure is a series of non-continuous matrix clusters.

11. The structural material of claim 2 wherein the ceramic structure is a series of non-continuous matrix clusters; the matrix clusters having members of variable lengths connecting at common attachment points.

12. The structural material of claim 2 wherein the ceramic structure is a series of non-continuous matrix clusters with members of variable cross-sections.

13. The composite material of claim 1 wherein the skeletal ceramic structure comprises:
    a network of hollow structural members connected to common hollow attachment points.

* * * * *